United States Patent
Nakajima et al.

(10) Patent No.: US 8,894,763 B2
(45) Date of Patent: Nov. 25, 2014

(54) PIGMENT COMPOSITION

(75) Inventors: Toshiki Nakajima, Tokyo (JP);
Masakiyo Urabe, Tokyo (JP); Mariko Numao, Tokyo (JP); Hiroki Tada, Tokyo (JP); Kenji Yamabe, Tokyo (JP)

(73) Assignee: Taisho Pharmaceutical Co., Ltd, Tokyo (JP)

( * ) Notice: Subject to any disclaimer, the term of this patent is extended or adjusted under 35 U.S.C. 154(b) by 0 days.

(21) Appl. No.: 13/634,763

(22) PCT Filed: Mar. 14, 2011

(86) PCT No.: PCT/JP2011/001467
§ 371 (c)(1),
(2), (4) Date: Sep. 13, 2012

(87) PCT Pub. No.: WO2011/114689
PCT Pub. Date: Sep. 22, 2011

(65) Prior Publication Data
US 2013/0008343 A1    Jan. 10, 2013

(30) Foreign Application Priority Data

Mar. 15, 2010   (JP) ................................. 2010-058047

(51) Int. Cl.
| | | |
|---|---|---|
| *C09D 11/02* | (2014.01) | |
| *C09B 63/00* | (2006.01) | |
| *C09B 67/46* | (2006.01) | |
| *C09B 67/08* | (2006.01) | |
| *C09D 11/037* | (2014.01) | |
| *C09D 11/326* | (2014.01) | |

(52) U.S. Cl.
CPC ......... *C09B 67/0086* (2013.01); *C09B 67/0008* (2013.01); *C09D 11/037* (2013.01); *C09D 11/326* (2013.01); *C09B 67/0013* (2013.01); *C09B 67/009* (2013.01)
USPC ........................................ 106/31.6; 106/402

(58) Field of Classification Search
USPC ................................. 106/31.6, 402
See application file for complete search history.

(56) References Cited

U.S. PATENT DOCUMENTS

| | | | | |
|---|---|---|---|---|
| 2005/0106198 | A1* | 5/2005 | Gotou et al. ................... | 424/401 |
| 2007/0224345 | A1 | 9/2007 | Metz et al. | |
| 2007/0232904 | A1* | 10/2007 | Kitayama ..................... | 600/431 |
| 2007/0281034 | A1 | 12/2007 | Kirpotin et al. | |
| 2008/0207774 | A1* | 8/2008 | Krishnan ..................... | 514/772.6 |
| 2011/0261107 | A1* | 10/2011 | Hara et al. ..................... | 347/20 |

FOREIGN PATENT DOCUMENTS

| | | | | |
|---|---|---|---|---|
| EP | 1834994 | | 9/2007 | |
| JP | 63-210181 | A | 8/1988 | |
| JP | 01144469 | A * | 6/1989 | ............... C09C 3/10 |
| JP | 1-204979 | A | 8/1989 | |
| JP | 10-279870 | A | 10/1998 | |
| JP | 2000038520 | | 2/2000 | |
| JP | 2001064531 | | 3/2001 | |
| WO | 2007133801 | | 11/2007 | |

OTHER PUBLICATIONS

Abstract of JP 01144469A.*
International Search Report for PCT/JP2011/001467 dated May 17, 2011.
Communication for EP 11755880.9 dated Jun. 25, 2013, with Supplementary European Search Report dated Jun. 11, 2013.
Office Action for Chinese Application No. 201180013997.9 dated Jul. 22, 2014.

* cited by examiner

*Primary Examiner* — Veronica F Faison
(74) *Attorney, Agent, or Firm* — Sughrue Mion, PLLC

(57) ABSTRACT

The present invention relates to a pigment composition containing a pigment and chondroitin sulfate or its salt, in which a content of chondroitin sulfate or its salt is equal to or larger than 0.1 part by weight (pbw) over 1 pbw of the pigment, and such pigment composition is available in the use for drug medicines and the like, and exhibits better dispersibility.

2 Claims, No Drawings

PIGMENT COMPOSITION

CROSS REFERENCE TO RELATED APPLICATIONS

This application is a National Stage of International Application No. PCT/JP2011/001467 filed Mar. 14, 2011, claiming priority based on Japanese Patent Application No. 2010-058047 filed Mar. 15, 2010, the contents of all of which are incorporated herein by reference in their entirety.

TECHNICAL FIELD

The present invention relates to a pigment composition.

BACKGROUND ART

A pigment dispersion liquid, generally obtained by dispersing a pigment in a liquid medium, is produced by conducting a dispersing process for a combination of a pigment, water, an organic solvent, a resin and the other additives with a disperser. In particular, a pigment dispersion liquid for producing an inkjet recording pigment ink is prepared by dispersing a pigment in a liquid medium with a dispersing agent such as a water-soluble polymer compound, a surfactant and the like. Higher dispersibility (agglomeration stability, sedimentation stability) is required for the prepared pigment ink, in order to ensure storage stability, discharge stability, and the like. The agglomeration stability and the sedimentation stability of the pigment ink are determined by primarily the performance of the employed dispersing agent.

Various types of dispersing agents including nonionic surfactants, anionic surfactants, block copolymers having hydrophilic block and hydrophobic block, resin emulsions containing resin particles and the like have been examined in the past (see Patent Document 1 and Patent Document 2). However, the conventional dispersing agents are not permitted to be used in medicinal additives and food additives, or even if it is permitted to be used, it is difficult to disperse the pigment to obtain an appropriate viscosity. More specifically, when the concentration of the dispersing agent is increased to ensure the agglomeration stability and the sedimentation stability of the pigment ink, problems such as an increase in the viscosity of the ink, a generation of a stick baking in the case of the thermal head, and the like are occurred, and thus it is difficult to satisfy both of the stability of the ink and the performances as the ink. Thus, there has been no report on a technology, which can achieve printing over the tablets such as drug medicine tablets and the like with an inkjet system.

In addition to above, while water-color inks containing acid mucopolysaccharides, which serve as medicinal additives and food additives, and colorants, are reported (Patent Document 3), an anionic or a nonionic surfactant is also employed as a dispersing agent for the pigment when a pigment ink is produced therewith, similarly as in the conventional technology.

RELATED DOCUMENTS

Patent Documents

[Patent Document 1]
  Japanese Laid-open Patent Publication No. H01-204979 (1989)
[Patent Document 2]
  Japanese Laid-open Patent Publication No. H10-279870 (1998)
[Patent Document 3]
  Japanese Laid-open Patent Publication No. S63-210181 (1988)

DISCLOSURE OF THE INVENTION

The object of the present invention is to provide a pigment composition with an improved dispersibility, which can be utilized for drug medicines and the like.

The present inventors have eagerly made investigations in order to solve the above-described problems, and according to the results of the investigations, it is found that better dispersion of the pigment is achieved by blending 0.1 part by weight (pbw) or more of chondroitin sulfate or its salt to 1 pbw of a pigment, and thus the present invention is made on the basis of such finding. More specifically, the present invention relates to:

(1) A pigment composition containing a pigment and chondroitin sulfate or its salt, in which the content of chondroitin sulfate or its salt is equal to or larger than 0.1 part by weight (pbw) over 1 pbw of the pigment.

(2) The pigment composition as described in (1), in which the pigment is an aluminum lake.

(3) An ink for printing over a drug medicine, containing the pigment composition described in (1) or (2).

The pigment composition of the present invention exhibits enhanced dispersibility of the pigment.

DESCRIPTION OF EMBODIMENTS

Chondroitin sulfate employed as a pigment agent of the present invention is a purified substance obtained by an extraction from fishes such as sharks, salmons or the like, and is a polymer having a structure based on disaccharide-repetition structural unit of D-glucuronic acid and N-acetyl-D-galactosamine, in which sulfate group is bound to N-acetyl-D-galactosamine. Salts of chondroitin sulfate include, for example, sodium chondroitin sulfate and calcium chondroitin sulfate, and sodium chondroitin sulfate is preferably employed. The content of chondroitin sulfate or its salt is equal to or larger than 0.1 pbw, and preferably 0.1 to 5 pbw, and more preferably 0.1 to 2 pbw, over 1 pbw of the pigment. While it is essential to blend it at a ratio of equal to or larger than 0.1 pbw in view of ensuring the dispersibility, excessive amount of the blending ratio causes an increased viscosity, which causes, for example, an insufficient discharge when it is employed as the ink for the inkjet equipment, and therefore it is preferable to be contained at equal to or lower than 5 pbw.

Sodium chondroitin sulfate is a mixture of multiple structures represented by A to E having sulfate group in different sites, and in particular, chondroitin-4-sulfate (also referred to as chondroitin sulfate A) and chondroitin-6-sulfate (chondroitin sulfate C) having sulfuric acid at a site of carbon 4 and carbon 6 of N-acetyl-D-galactosamine, respectively, are typical structures. For example, Japanese Pharmaceutical Codex sodium chondroitin sulfate [for injection, ocular instillation (shark), for internal use (shark), for internal use (shark/porcine)] commercially available from Maruha Nichiro Foods, inc., Japanese Pharmaceutical Codex sodium chondroitin sulfate (N grade, ND grade) commercially available from SEIKAGAKU CORPORATION, may be available in the use.

According to the present invention, the pigment compositions with improved dispersibility can be obtained by employing chondroitin sulfate or its salts, without a need for employing the conventional dispersing agent for the pigment such as anionic or nonionic surfactant and the like.

The types of the pigments available in the present invention are not particularly limited, and typical exemplified pigments include inorganic pigments such as carbon black, medical charcoal, titanium dioxide, iron sesquioxide, yellow iron sesquioxide, black iron oxide, calcium carbonate and the like. In addition, the available pigments includes edible tar dyes such as Red No.2 (known as Amaranth), Red No. 3 (known as Erythrosine), Red No. 102 (known as new Coccine), Red No. 104 (known as Phloxine B), Red No. 105 (known as Rose Bengal), Red No. 106 (known as Acid Red), Yellow No. 4 (known as Tartrazine), Yellow No. 5 (known as Sunset Yellow FCF), Green No. 3 (known as Fast Green FCF), Blue No. 1 (known as Brilliant Blue FCF), Blue No. 2 (known as Indigo Carmine), Red No. 227 (known as Fast Acid Magenta), Red No. 230-(1) (known as Eosine YS), Red No. 230-(2) (known as Eosine YSK), Red No. 231 (known as Phloxin BK), Red No. 232 (known as Rose Bengal K), Orange No. 205 (known as Orange II), Orange No. 207 (known as Erythrosine Yellowish NA), Yellow No. 202-(1) (known as Uranine), Yellow No. 202-(2) (known as Uranine K), Yellow No. 203 (known as Quinoline Yellow WS), Green No. 201 (known as Alizarine Cyanine Green F), Green No. 204 (known as Pyranine Conc.), Green No. 205 (known as Light Green SF Yellowish), Blue No. 205 (known as Alphazurine FG), Brown No. 201 (known as Resorcin Brown), Red No. 401 (known as Violamine R), Red No. 502 (known as Ponceau 3R), Red No. 503 (known as Ponceau R), Red No. 504 (known as Ponceau SX), Red No. 506 (known as Fast Red S), Orange No. 402 (known as Orange I), Yellow No. 402 (known as Polar Yellow 5G), Yellow No. 403-(1) (known as Naphthol Yellow S), Yellow No. 406 (known as Metanil Yellow), Yellow No. 407 (known as Fast Light Yellow 3G), Green No. 402 (known as Guinea Green B), Purple No. 401 (known as Alizurol Purple), Black No. 401 (known as Naphthol Blue Black), and aluminum lakes thereof, which are available for the use in drug medicines. These pigments may be preferably blended at a ratio within a range of from 0.1 to 20% by weight over the pigment composition of the present invention.

The pigment composition of the present invention may be employed as an ink or paint. In addition, the pigment composition of the present invention exhibits better dispersibility of the pigment and is stable against the agglomeration or the sedimentation, and thus in particular, may be preferably employed as the ink for the inkjet applications. In addition, the present invention employs chondroitin sulfate or its salt as a dispersing agent, and thus may be employed to prepare an edible pigment composition by employing a combination with an edible pigment. More specifically, the pigment composition may be employed as, for example, an ink for printing over the tablets such as drug medicines and the like.

The pigment composition of the present invention may be prepared by adding chondroitin sulfate or its salt in a liquid medium in advance and then adding a pigment, or by mixing a pigment and a liquid medium and then adding chondroitin sulfate or its salt, and thereafter dispersing the pigment by employing a disperser such as a high pressure homogenizer, a ball mill, a sand mill, a sand grinder, a bead mill and the like.

Water or a mixed solvent of water and a water-soluble organic solvent may be preferable for the above-described liquid medium. Typical water-soluble organic solvents may include, for example: alcohols such as methyl alcohol, ethyl alcohol, n-butyl alcohol, isobutyl alcohol, tert-butyl alcohol, n-propyl alcohol, isopropyl alcohol and the like; amides such as dimethylformamide, dimethylacetamide and the like; ketones such as acetone, methyl ethyl ketone and the like; ethers such as tetrahydrofuran, dioxane, ethylene glycol methyl ether, ethylene glycol ethyl ether, diethylene glycol methyl ether, diethylene glycol ethyl ether, triethylene glycol monomethyl ether, triethylene glycol monoethyl ether and the like; polyalcohols such as ethylene glycol, propylene glycol, butylene glycol, diethylene glycol, triethylene glycol, 1,2,6-hexanetriol, thiodiglycol, polyethylene glycol, polypropylene glycol, glycerin, diglycerin, polyglycerin and the like; N-methylpyrrolidone; 1,3-dimethyl-2-imidazolidinone; and the like.

Additives such as water soluble resins, organic amines, surfactants, PH adjusters, chelating agents, antiseptic agents, viscosity adjusters, antifoaming agents and the like may be added to the pigment composition of the present invention, as required.

While the present invention will specifically described in reference to Examples and Comparative Examples as described below, it is understood that the scope of the present invention is not limited to these Examples.

EXAMPLES

Example 1

10 grams (g) of a dispersion liquid of pulverized Blue No. 2 aluminum lake, 1 g of sodium chondroitin sulfate, 15 g of glycerin and 74 g of purified water were mixed and stirred to obtain a pigment composition. The dispersion liquid of pulverized Blue No. 2 aluminum lake employed here was obtained by adding 10 g of aluminum lake of Blue No. 2 to 90 g of purified water and then pulverizing the mixture by employing a high pressure homogenizer. "Nanomizer" (YOSHIDA KIKAI CO., LTD.) was employed for the high pressure homogenizer, and the pulverization processing was conducted at a processing pressure of 200 MPa.

Comparative Examples 1 to 15

Similar methods as employed in Example 1 were conducted to produce pigment compositions of Comparative Example 1 without blending a dispersing agent and Comparative Examples 2 to 15 with different dispersing agents other than sodium chondroitin sulfate. The formulations of the compositions of Comparative Examples 1 to 15 are shown in Table 1 and Table 2. The units of the blending ratio of the respective components in the tables are "gram (g)."

The evaluations on the dispersibility of the above-described pigment compositions were carried out by an observation with a polarization-microscope at 400 magnifications for the state of the dispersion of Blue No. 2 aluminum lake, which was stirred and mixed and then was left at a room temperature for 24 hours. The results are shown in Table 1 and Table 2. The evaluated results of the dispersibility in these tables indicate the following states: AA better dispersed; BB not dispersed; and CC not dispersed and rapidly aggregated.

TABLE 1

|  | EXAMPLE | COMPARATIVE EXAMPLES | | | | | | |
|---|---|---|---|---|---|---|---|---|
| COMPONENTS | 1 | 1 | 2 | 3 | 4 | 5 | 6 | 7 |
| DISPERSION LIQUID OF PULVERIZED EDIBLE BLUE No. 2 ALUMINUM LAKE | 10 | 10 | 10 | 10 | 10 | 10 | 10 | 10 |
| SODIUM CHONDROITIN SULFATE | 1 | 0 | 0 | 0 | 0 | 0 | 0 | 0 |
| CARRAGEENAN | 0 | 0 | 1 | 0 | 0 | 0 | 0 | 0 |
| HYALURONIC ACID | 0 | 0 | 0 | 1 | 0 | 0 | 0 | 0 |
| POLYOXYETHYLENE HYDROGENATED CASTOR OIL | 0 | 0 | 0 | 0 | 1 | 0 | 0 | 0 |
| POLYOXYETHYLENE SORBITAN MONOSTEARATE | 0 | 0 | 0 | 0 | 0 | 1 | 0 | 0 |
| POLYOXYETHYLENE SORBITAN OLEATE | 0 | 0 | 0 | 0 | 0 | 0 | 1 | 0 |
| BENZALKONIUM CHLORIDE | 0 | 0 | 0 | 0 | 0 | 0 | 0 | 1 |
| GLYCERIN | 15 | 15 | 15 | 15 | 15 | 15 | 15 | 15 |
| PURIFIED WATER | 74 | 75 | 74 | 74 | 74 | 74 | 74 | 74 |
| GROSS QUANTITY | 100 | 100 | 100 | 100 | 100 | 100 | 100 | 100 |
| DISPERSIBILITY | AA | BB | CC | CC | BB | BB | BB | BB |

TABLE 2

|  | COMPARATIVE EXAMPLES | | | | | | | |
|---|---|---|---|---|---|---|---|---|
| COMPONENTS | 8 | 9 | 10 | 11 | 12 | 13 | 14 | 15 |
| DISPERSION LIQUID OF PULVERIZED EDIBLE BLUE NO. 2 | 10 | 10 | 10 | 10 | 10 | 10 | 10 | 10 |
| GLYCERINE FATTY ACID ESTER | 1 | 0 | 0 | 0 | 0 | 0 | 0 | 0 |
| POLYETHYLENE GLYCOL | 0 | 1 | 0 | 0 | 0 | 0 | 0 | 0 |
| POLYVINYL ALCOHOL | 0 | 0 | 1 | 0 | 0 | 0 | 0 | 0 |
| HYDROXYPROPYLCELLULOSE | 0 | 0 | 0 | 1 | 0 | 0 | 0 | 0 |
| HYDROXYPROPYL METHYLCELLULOSE | 0 | 0 | 0 | 0 | 1 | 0 | 0 | 0 |
| SODIUM CARBOXYMETHYLCELLULOSE | 0 | 0 | 0 | 0 | 0 | 0.1 | 0 | 0 |
| SODIUM POLYACRYLATE | 0 | 0 | 0 | 0 | 0 | 0 | 0.1 | 0 |
| POLYVINYLPYRROLIDONE | 0 | 0 | 0 | 0 | 0 | 0 | 0 | 1 |
| GLYCERIN | 15 | 15 | 15 | 15 | 15 | 15 | 15 | 15 |
| PURIFIED WATER | 74 | 74 | 74 | 74 | 74 | 75 | 75 | 74 |
| GROSS QUANTITY | 100 | 100 | 100 | 100 | 100 | 100 | 100 | 100 |
| DISPERSIBILITY | BB | BB | BB | BB | BB | CC | CC | BB |

According to the results in Table 1 and Table 2, it was found that improved dispersibility was obtained only in the case of blending sodium chondroitin sulfate.

Example 2

5 g of Blue No. 2 aluminum lake, 0.5 g of sodium chondroitin sulfate, 10 g of glycerin and 84.5 g of purified water were mixed and stirred to obtain a dispersion liquid.
A pulverization processing was conducted for the dispersion liquid by employing an agitator and zirconia beads. The proportion of the beads and the sample in volume ratio at the time of the mixing and the pulverization was 1:1, and two-step pulverization processing of rough pulverization and fine pulverization was conducted. The pulverization processing, in this case, was conducted at the room temperature (at about 25 degrees C.).

Comparative Examples 16 to 18

Reduced blending ratio of sodium chondroitin sulfate was employed and such reduced amount was compensated by increasing the ratio of purified water to provide pigment compositions having the formulation shown in Table 3 by conducting similar method as in Example 2 (Comparative Examples 16-18). The units of the blending ratio of the respective components in the tables are "gram (g)."

The evaluations on the dispersibility of the above-described pigment compositions were carried out by an observation with a polarization-microscope at 400 magnifications for the state of the dispersion of Blue No. 2 aluminum lake, which was mixed and then was left at a room temperature for 72 hours. The viscosity measurements were conducted with a digital viscometer. The results are shown in Table 3. The evaluated results of the dispersibility in the table indicate the following states: AA better dispersed; and BB not dispersed.

TABLE 3

|  | EXAMPLE | COMPARATIVE EXAMPLES | | |
|---|---|---|---|---|
| COMPONENTS | 2 | 16 | 17 | 18 |
| EDIBLE BLUE NO. 2 ALUMINUM LAKE | 5 | 5 | 5 | 5 |
| SODIUM CHONDROITIN SULFATE | 0.5 | 0.375 | 0.25 | 0.05 |

TABLE 3-continued

| COMPONENTS | EXAMPLE 2 | COMPARATIVE EXAMPLES | | |
|---|---|---|---|---|
| | | 16 | 17 | 18 |
| GLYCERIN | 10 | 10 | 10 | 10 |
| PURIFIED WATER | 84.5 | 84.625 | 84.75 | 84.95 |
| GROSS QUANTITY | 100 | 100 | 100 | 100 |
| SODIUM CHONDROITIN SULFATE/PIGMENT | 0.10 | 0.075 | 0.05 | 0.01 |
| VISCOSITY [cP] | 2.3 | 4.1 | 5.0 | 7.5 |
| DISPERSIBILITY | AA | BB | BB | BB |

It was found that it cannot sufficiently disperse Blue No. 2 aluminum lake if the blending ratio of sodium chondroitin sulfate is equal to or lower than 0.075 pbw over 1 pbw of the pigment as in Comparative Example 16.

INDUSTRIAL APPLICABILITY

Since the pigment composition of the present invention exhibits better dispersibility, such composition can be preferably employed in an ink for a writing implement such as an ordinary ball-point pen or the like, or a paint, or in particular, an inkjet recording pigment ink.

The invention claimed is:

1. A pigment composition comprising a pigment and chondroitin sulfate or its salt dispersed in a liquid medium,
    wherein a content of chondroitin sulfate or its salt is equal to or larger than 0.1 part by weight (pbw) over 1 pbw of the pigment wherein the pigment is an aluminum lake pigment.

2. A method for printing over a drug medicine, comprising printing over the drug medicine with an ink containing the pigment composition according to claim 1.

* * * * *